(12) United States Patent
Hull et al.

(10) Patent No.: US 8,934,872 B2
(45) Date of Patent: *Jan. 13, 2015

(54) MOBILE ELECTRONIC COMMUNICATION DEVICE WITH LIGHTS TO INDICATE RECEIVED MESSAGES (75) Inventors: Eric J. Hull, Seattle, WA (US); Jonathan O. Nelson, Kirkland, WA (US); Gary N. Mager, Seattle, WA (US)

(73) Assignee: Varia Holdings LLC, Brooklyn, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/912,582

(22) Filed: Oct. 26, 2010

(65) Prior Publication Data

US 2011/0124367 A1    May 26, 2011

Related U.S. Application Data (63) Continuation of application No. 10/791,036, filed on Mar. 2, 2004, now Pat. No. 7,826,827, which is a continuation of application No. 09/931,788, filed on Aug. 16, 2001, now Pat. No. 6,720,863.

(51) Int. Cl.
*H04M 1/725* (2006.01)
*H04M 1/22* (2006.01)
(Continued)

(52) U.S. Cl.
CPC .............. *H04M 1/22* (2013.01); *H04M 1/576* (2013.01); *H04M 1/72547* (2013.01); *H04M 19/04* (2013.01); *H04M 1/72552* (2013.01); *H04M 19/048* (2013.01)
USPC .................. 455/412.2; 455/575.1; 455/412.1; 455/550.1; 715/808; 709/206

(58) Field of Classification Search
USPC ...................... 455/575.1, 412.1, 550.1, 412.2; 715/808; 709/206
See application file for complete search history.

(56) References Cited

U.S. PATENT DOCUMENTS 4,374,308 A     2/1983  Holesha
4,975,694 A  *  12/1990  McLaughlin et al. ....... 340/7.55
5,270,931 A    12/1993  Appleford
(Continued)

FOREIGN PATENT DOCUMENTS

EP    1109380    6/2001
JP    05176044   7/1993

OTHER PUBLICATIONS

Supplementary European Search Report for EP Application No. 02768569, mailed Aug. 3, 2006.
(Continued)

*Primary Examiner* — Justin Lee
(74) *Attorney, Agent, or Firm* — Schwabe, Williamson & Wyatt, P.C.

(57) ABSTRACT

A mobile electronic communication device includes a processor unit, a transceiver, a keypad and a light unit. Each key of the keypad is associated with a contact of a contact list. The light unit can perform light functions to notify a user of the reception and/or status of messages received via the transceiver. The light functions include providing an indication of the age of a received message that was sent by a contact in the contacts list. The age of the message is indicated by a modulation of the illuminating light. In one embodiment, the age of a message is indicated as one of a set of predetermined age ranges, with each age range being represented by a unique color.

15 Claims, 8 Drawing Sheets (51) Int. Cl.
*H04M 1/57* (2006.01)
*H04M 19/04* (2006.01)

(56) References Cited

U.S. PATENT DOCUMENTS

| | | | |
|---|---|---|---|
| 5,546,078 A | 8/1996 | Motohashi | |
| 5,553,125 A | 9/1996 | Martensson | |
| 5,555,550 A | 9/1996 | Kaschki | |
| 5,579,472 A | 11/1996 | Keyworth | |
| 5,703,934 A | 12/1997 | Zicker et al. | |
| 5,748,106 A | 5/1998 | Schoenian et al. | |
| 5,793,304 A | 8/1998 | Sone | |
| 5,877,695 A | 3/1999 | Kubes et al. | |
| 5,946,636 A | 8/1999 | Uyeno et al. | |
| 5,978,468 A | 11/1999 | Boakes et al. | |
| 6,320,941 B1 | 11/2001 | Tyroler | |
| 6,348,860 B1 * | 2/2002 | Davis et al. | 340/525 |
| 6,430,405 B1 | 8/2002 | Jambhekar et al. | |
| 6,553,223 B1 | 4/2003 | Bayley et al. | |
| 6,720,863 B2 | 4/2004 | Hull et al. | |
| 6,753,842 B1 * | 6/2004 | Williams et al. | 345/102 |
| 6,831,568 B1 | 12/2004 | Cortopassi et al. | |
| 6,959,207 B2 * | 10/2005 | Keinonen et al. | 455/567 |
| 7,103,154 B1 | 9/2006 | Cannon et al. | |
| 7,826,827 B2 * | 11/2010 | Hull et al. | 455/412.2 |
| 2002/0147777 A1 * | 10/2002 | Hackbarth et al. | 709/205 |
| 2006/0211411 A1 | 9/2006 | Haaramo et al. | |
| 2011/0136431 A1 * | 6/2011 | Haaramo et al. | 455/41.1 |

OTHER PUBLICATIONS

International Search Report for Application No. PCT/US02/26051, mailed Oct. 13, 2004.

* cited by examiner

MOBILE ELECTRONIC COMMUNICATION DEVICE WITH LIGHTS TO INDICATE RECEIVED MESSAGES

RELATED APPLICATIONS

This application is a continuation of U.S. application Ser. No. 10/791,036, titled "Mobile Electronic Communication Device With Lights To Indicate Received Messages," filed on Mar. 2, 2004 and issued as U.S. Pat. No. 7,826,827, which is a continuation of U.S. application Ser. No. 09/931,788, filed on Aug. 16, 2001 and issued as U.S. Pat. No. 6,720,863, both having the same title and inventorship. The present application claims priority to said '036 application and said 788 application, the full disclosures of which are incorporated by reference herein.

TECHNICAL FIELD

The present invention relates to mobile electronic communication devices, and more particularly, the present invention relates to message indicators for use in mobile electronic communication devices.

BACKGROUND

Mobile electronic communication devices such as cellular telephones, pagers, and wireless PDAs (personal digital assistants) are in wide use. Many such mobile electronic communication devices offer core functions such as a contact list, call log, voice mail and so forth, while many high-end models offer advanced functions such as Internet access and messaging services. Currently, most mobile electronic communication devices use a sound or a text message to notify the user that the mobile electronic communication device has received a message. However, these notifications typically do not provide a quick and easy method to determine the senders' identities, nor do they provide an indication of how much time has passed since the mobile electronic communication device received the messages. For example, in some of these existing mobile electronic communication devices, the user must navigate through one or more menus displayed by the mobile electronic communication device to access messages to determine a sender's identity and the time the message was received.

SUMMARY

According to aspects of the present invention, a mobile electronic communication device having a message status indication system is provided. In one aspect, the mobile electronic communication device includes a processor unit, a transceiver, a keypad and a light unit. The light unit is used in performing light functions to provide an indication of the sender of a message received by the mobile electronic communication device.

In another aspect of the present invention, the mobile electronic communication device includes a contact list. The light functions include providing a notification that the mobile electronic communication device has received a message sent by a contact listed in the contact list.

In yet another aspect of the present invention, the light functions include providing an indication of the relative age of received messages. In one embodiment, the mobile electronic communication device categorizes a received message into one of several predefined age categories, with a particular light function associated with each age category. For example, the age categories may include "new", "intermediate" and "old" age categories. Continuing this example, these age categories are respectively associated with green, yellow and red lights, which are provided via the aforementioned light unit.

In a further aspect of the present invention, each key of the keypad is associated with a contact in the contact list. This aspect allows the mobile electronic communication device to indicate whether the mobile electronic communication device has received a message from a contact in the contact list by performing a light function via the key corresponding to the contact. For example, a message from the first contact or entry listed in the contact list can be indicated by illuminating the "1" key of the keypad (i.e., the key for entering the numeral "1"). In a further refinement of this aspect, a key can be programmed to automatically initiate a message operation addressed to the contact associated with the key.

In still another aspect of the present invention, the mobile electronic communication device may include a virtual keypad. For example, the virtual keypad may be implemented using a touch-screen LCD (liquid crystal display) or similar device. The touch-screen device can be used to display an illustration of a keypad, with each "key" operating like an icon for causes the character or symbol represented by the key to be inputted when the user activates the "key." A user can activate a "key" of the virtual keypad by contacting the portion of the touch-screen that is displaying the "key." In one embodiment, light functions can be performed by changing the appearance the virtual keys. For example, the light functions can include causing the color or shade of a "key" to change, a "key" to flash or blink, or causing a "key" to appear animated (e.g. to morph into a telephone illustration, rotate, appear to vibrate, etc.).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for a mobile electronic communication device with light functions to indicate waiting messages and input keys for viewing messages are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Because of the increased use of mobile electronic communication devices as a messaging device, a need has arisen for an easy way to check the status of messages that have been received. The present invention is directed towards a method and apparatus that allows a user to quickly and easily determine if any messages have been received, along with the sender's identity and the relative age of the message.

Figure 1:
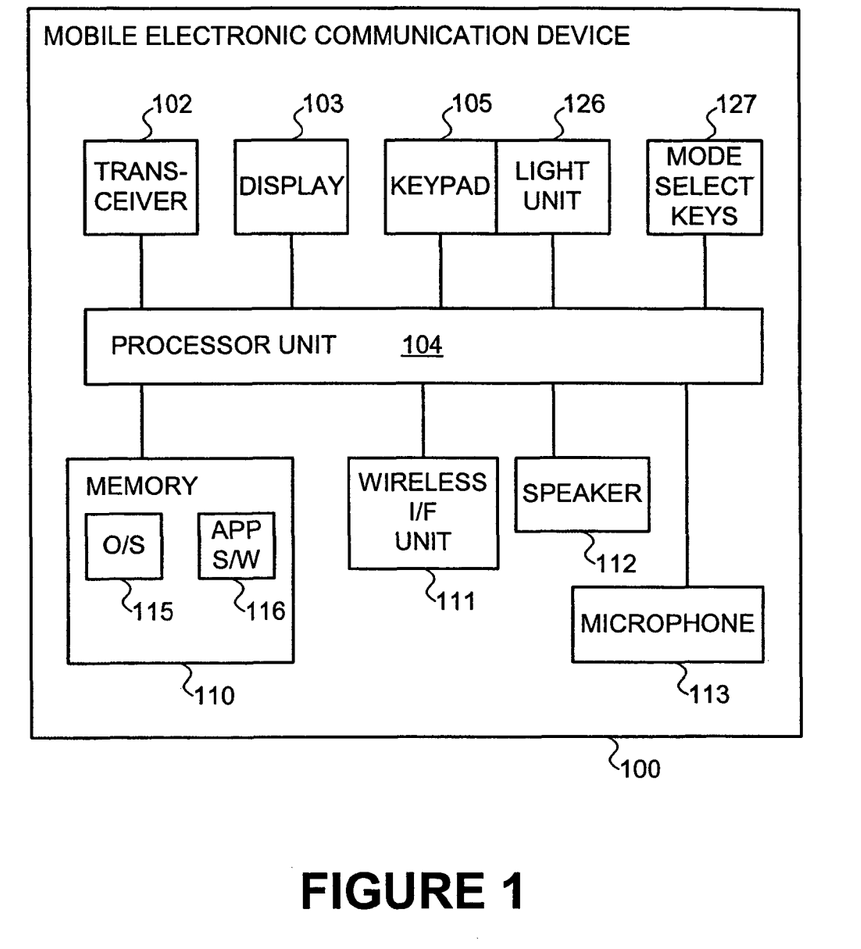
FIG. 1 is a block diagram of a mobile electronic communication device according to one embodiment of the present invention.

FIG. 1 illustrates one embodiment of a mobile electronic communication device 100 according to the present invention. In this embodiment, the mobile electronic communication device 100 includes a transceiver 102, a display 103, a processor unit 104, a keypad 105, memory 110, a wireless interface unit 111, an audio speaker 112, a microphone 113, an operating system 115, and application software 116. In this exemplary embodiment, operating system 115 and application software 116 is stored in memory 110. In addition, mobile electronic communication device 100 also includes a light unit 126 and mode select key or keys 127 (hereinafter "keys 127"). In some embodiments, mode select keys 127 may be omitted.

In one embodiment, transceiver 102, display 103, keypad 105, memory 110, wireless interface unit 111, speaker 112, microphone 113, light unit 126, and mode select keys 127 are connected to processor unit 104. Processor unit 104 sends and receives commands from the operating system 115. The operating system 115 in conjunction with the processor unit 104 controls the application software 116.

In addition, light unit 126 is associated with keys of keypad 105. In one embodiment, light unit 126 is disposed in mobile electronic communication device 100 so that preselected keys (e.g. the numeric keys) of the keypad 105 can be selectively illuminated by the light unit 126. For example, light unit 126 may be located beneath keypad 105 so that light unit 126 can illuminate individual keys (which would be translucent or partially translucent in this example) of keypad 105. In one embodiment, light unit 126 includes each of the preselected keys of keypad 105 has its own dedicated light source (or light sources). In other embodiments, a light source may provide light to more than one key of keypad 105, with appropriate switching to allow the light to illuminate a selected key or keys.

In operation, transceiver 102 is used to receive messages as in known mobile electronic communication devices, for example short message service (SMS), code division multiple access (CDMA), time division multiple access (TDMA), global system for mobile communications (GSM), and general packet radio service (GPRS). The wireless interface unit 111 operates in conjunction with the transceiver 102 to send and receive information. The audio speaker 112 can broadcast the signals received from the transceiver 102. Display 103 is used to display text and/or images. For example, display 103 can be implemented with a LCD. Processor unit 104 can store received message information in the memory 110. Processor unit 104 can also control display 103 to display the stored message information or other data from memory 110. A user may use keypad 105 to input data and/or instructions to the processor unit 104. In accordance with the present invention, processor unit 104 can control light unit 126 to provide an indication of the status of messages received by mobile electronic communication device 100. Light unit 126 can be implemented using any suitable type of light source such as, for example, light bulbs, LEDs (light emitting diodes), LCDs, etc. A user can also use mode select keys 127 to input commands to the processor unit 104 to switch between different operative modes of mobile electronic communication device 100. Mobile electronic communication device 100 indicates the status of received messages as described below in conjunction with FIG. 2.

Figure 2:
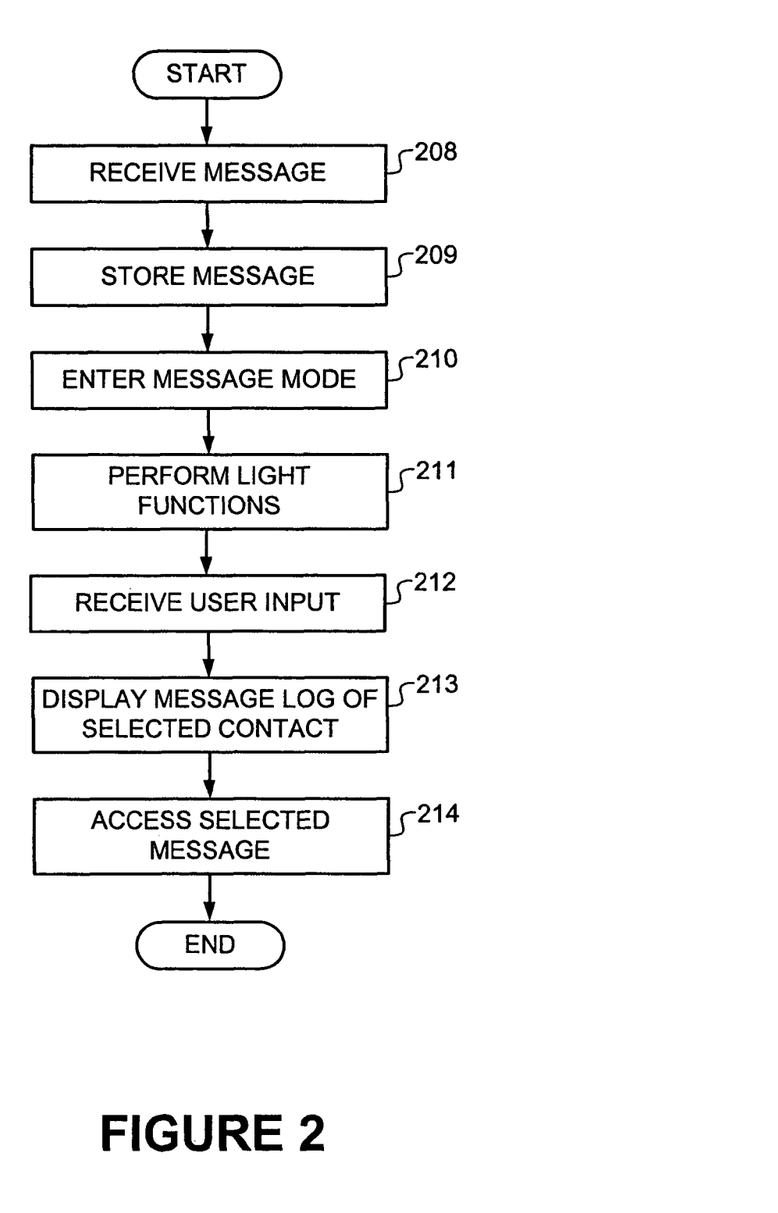
FIG. 2 is a flow diagram illustrating an operational flow of the mobile electronic communication device as shown in FIG. 1, according to one embodiment of the present invention.

FIG. 2 illustrates the operational flow of mobile electronic communication device 100 in indicating the status of one or more received messages, according to one embodiment of the present invention. Referring to FIGS. 1 and 2, mobile electronic communication device 100 performs the above operational flow as follows.

In a step 208, mobile electronic communication device 100 receives a message such as an e-mail message, a SMS (short message service) message, or a voice-mail message, for example. In one embodiment, transceiver 102 receives the message as in a standard mobile electronic communication device.

In a step 209, the received message is stored. In one embodiment, transceiver 102 provides the received message to processor unit 104, which can then store the message data. In addition, processor unit 104 may store other related data such as sender identification, a time-stamp (i.e., the time that mobile electronic communication device 100 received the message), and read status (i.e., an indication of whether the message was accessed by a user) in memory 60. An example of a data structure to store messages is described below in conjunction with FIG. 3. In one embodiment, the message data can be stored in memory 60 included in processor unit 104.

In a step 210, mobile electronic communication device 100 enters a message mode. In one embodiment, the message mode is a mode in which the user may send messages or access messages (e.g. display a message via display 103 so that the user may read the message) that are stored in mobile electronic communication device 100. In one embodiment, the user may input a command for mobile electronic communication device 100 to enter the message mode. In other embodiments, step 210 can be a default action that is automatically performed after mobile electronic communication device 100 receives a message. Step 210 need not be performed when mobile electronic communication device 100 is already in the message mode, or in embodiments in which mobile electronic communication device 100 has no modes other than message mode.

In a step 211, mobile electronic communication device 100 can perform light functions to provide an indication of the status of messages received from contacts stored in a contact list. In one embodiment, the user may create and maintain a contact list in mobile electronic communication device 100. The contact list typically contains contact information such as, for example, the names of contacts and their telephone numbers, email addresses, etc. As used herein, "light functions" are operations in which the light unit 126 is used to indicate the status and/or source of messages received by mobile electronic communication device 100. For example, the light functions can indicate the relative age of a received message by causing light unit 126 to output light in a predefined manner.

In one embodiment, preselected keys of keypad 105 are associated with contacts or entries in the contact list. For example, the preselected keys may be the number keys of keypad 105, with each number being associated with an entry or contact in the contact list. In one embodiment, the first entry in the contact list can be associated with the "1" key of keypad 105, the second entry with the "2" key of keypad 105, and so on. The light functions can indicate that a message was received from the first entry in the contact list by illuminating the "1" key using light unit 126. In addition, mobile electronic communication device 100 can be configured to allow the user to select the association of contacts to keys. For example, in one embodiment, the user can associate up to ten contacts to the numeric keys of keypad 105.

In a further refinement, the light functions can also indicate the relative age of the message by modulating the light used to illuminate the key. The term "modulate" is used in a broad sense in providing light with controlled parameters such as color or intensity using one or more light sources. For example, the modulation may be implemented by controlling the wavelength (i.e., color) of the light used to illuminate the key that depends on the age of the message. Each color, for example, can be produced by a separate dedicated light source that is turned on while the other light sources are turned off. Alternatively, a single light source that has a dynamically configurable output wavelength can be used. Other systems or techniques can be used to generate light of the desired wavelengths. In other embodiments, the modulation may be implemented by causing the light to flash or blink at a rate corresponding to the age of the message.

In an exemplary embodiment, the relative age of a message is categorized into one of three categories; namely "new", "intermediate", and "old" messages. These categories are respectively associated with the colors green, yellow and red, so that green indicates a "new" message, yellow indicates an "intermediate" message, and red indicates an "old" message. In one embodiment, a "new" message is one that was received less than three minutes from when its corresponding key was illuminated. An "intermediate" message is one that was received more than three minutes but less than fifteen minutes from when its corresponding key was illuminated. An "old" message is one that was received more than fifteen minutes from when its corresponding key was illuminated. In other embodiments, the age categories may be indicated using different colors, may be different in number, and may be different in the transition points between age categories.

Thus, in this exemplary embodiment, the light functions would indicate a "new" message from the second entry of the contact list by illuminating the "2" key with a green light. Continuing the example, the light functions can indicate a message with an "intermediate" age sent by the third entry of the contact list by illuminating the "3" key with a yellow light, and so. In one embodiment, not more than one color is used to indicate messages corresponding to particular contacts. The color used indicates the age of the most recent message from that contact.

In other embodiments, the relative age of a received message may be indicated in other ways such as, for example, by varying the brightness of the illumination or by causing the illumination to flash or blink. For example, the frequency, duty cycle, or other parameter of the blinking can depend on the relative age of the message. In one embodiment, steady light indicates old messages, slow blinking light indicates intermediate messages, and fast blinking light indicates new messages. In still another embodiment, the blinking may be grouped to indicate relative age. For example, a single blink cyclically performed may be used to indicate an old message; a group of two blinks cyclically performed may be used to indicate an intermediate message; and a group of three blinks cyclically performed may be used to indicate a new message. Alternatively, the number of blinks performed in a cycle may be used to indicate the number of messages left by the sender.

Still further, the color, blinking, intensity or other parameter of the light can be used to indicate the importance of the message (which can be set by the sender). For example, the sender may set the importance as low, regular, or high importance, which are indicated by the colors green, yellow and red, respectively. In addition, in this example, fast, slow and no blinking (as described above) indicates the message as new, intermediate and old, respectively. Thus, in this example, a fast blinking red light illuminating the numeric key "8" of keypad 105 indicates that an important new message has been received from the contact corresponding to the eighth contact of the contact list.

In yet another embodiment, the color, blinking, intensity or other parameter of the light can be used to indicate the type of message received. For example, the message may be an email, a SMS message, a voice mail, which can each be indicated by a preselected color or other parameter of the light provided by light unit 106 (FIG. 1).

A variety of different systems and methods can be used to modulate light to indicate the age, number, importance, type and/or other parameter of received messages.

In a step 212, mobile electronic communication device 100 can receive an input from the user. In one embodiment, the user can activate a key of keypad 105 to select the contact associated with the activated key.

In a step 213, in response to the input by the user, mobile electronic communication device 100 can display information related to messages, if any, sent by the selected contact listed in the contact list. In one embodiment, the user can cause mobile electronic communication device 100 to provide information related to stored messages received from the contact selected in step 212. Processor unit 104 accesses the stored messages (see step 209) and causes display 103 to display information related to messages sent by the selected contact. For example, the message information can list all of the stored messages that were sent by the contact corresponding to the activated key. In one embodiment, a message log corresponding to the contact is displayed. The message log displays messages received from the contact as well as messages sent to the contact, in reverse chronological order. In another embodiment, the message log displays SMS messages entirely (i.e., the text) in reverse chronological order and no additional action is required to read the messages.

In a step 214, mobile electronic communication device 100 then accesses messages in response to commands from the user. In one embodiment, the user can select a message displayed in step 213 to perform an operation on the message. For example, the user can use keypad 105 to select a desired message. The user can then cause mobile electronic communication device to perform an operation on the selected message. For example, the user can save, display, or delete the selected message. In one embodiment, the aforementioned user-selectable operations can be provided in a menu via display 103. A user can then use keypad 105 to select or initiate one of the menu-displayed operations. In a further refinement, a time-out feature may be implemented to perform a default operation (e.g., saving the message) if the user does not select an operation within a predetermined period.

The above description the association of keys of keypad 105 (FIG. 1) to contacts in the contact list relates to receiving messages. In a further refinement, the keys may be used in implementing a shortcut technique to send a message to a contact. When not performing the operations of FIG. 2, the user can configure mobile electronic communication device into a communication mode (e.g., telephone, SMS, email modes) and then activate the key corresponding to a desired contact. For example, the user can use function keys 107 to place mobile electronic communication device 100 into the desired mode. This operation results in a shortcut operation that allows the user to make a telephone call with the contact corresponding to the activated key. For example, this operation may be "speed dial" the telephone number of the contact, or open a "compose new message" window that is already addressed to the contact. Thus, in accordance with the present invention, the use of a particular key on keypad 105 can indicate when a message is received from a corresponding contact; view messages from the contact; and initiate a message operation addressed to the contact, depending on the mode of mobile electronic communication device 100.

Figure 3:
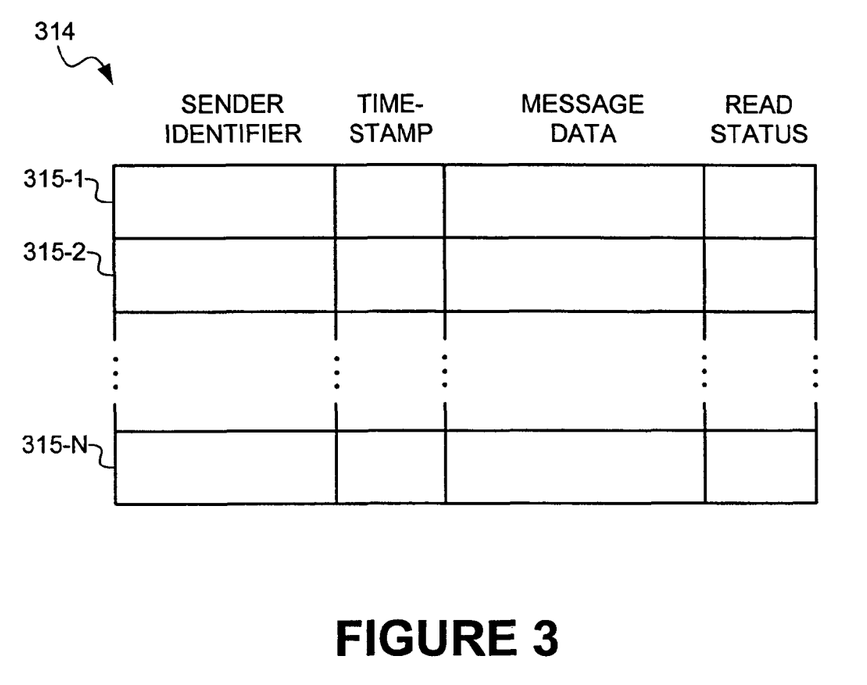
FIG. 3 is a diagram illustrating a datastore for storing messages, according to one embodiment of the present invention.

FIG. 3 illustrates a datastore 314 for storing message information, according to one embodiment of the present invention. In this embodiment, datastore 314 is a list structure that includes message elements 315-1, 315-2, . . . , 315-N. Each message element includes at least the following fields: a sender identifier (e.g., the sender's name, a telephone number, an email address, etc.); a time stamp (i.e., the time the message was received); the message data (e.g., message text, digitized voice data); and a read status (i.e., whether the message has been read). A sender identifier is typically included in a header of a received message. In other embodiments, datastore 314 may have other fields. Other data structures suitable for storing the above message information can be used. In one embodiment, a similar datastore is used to keep all messages sent to each contact. In this embodiment, outgoing and incoming messages are combined to produce a message log for a selected contact.

Figure 4:
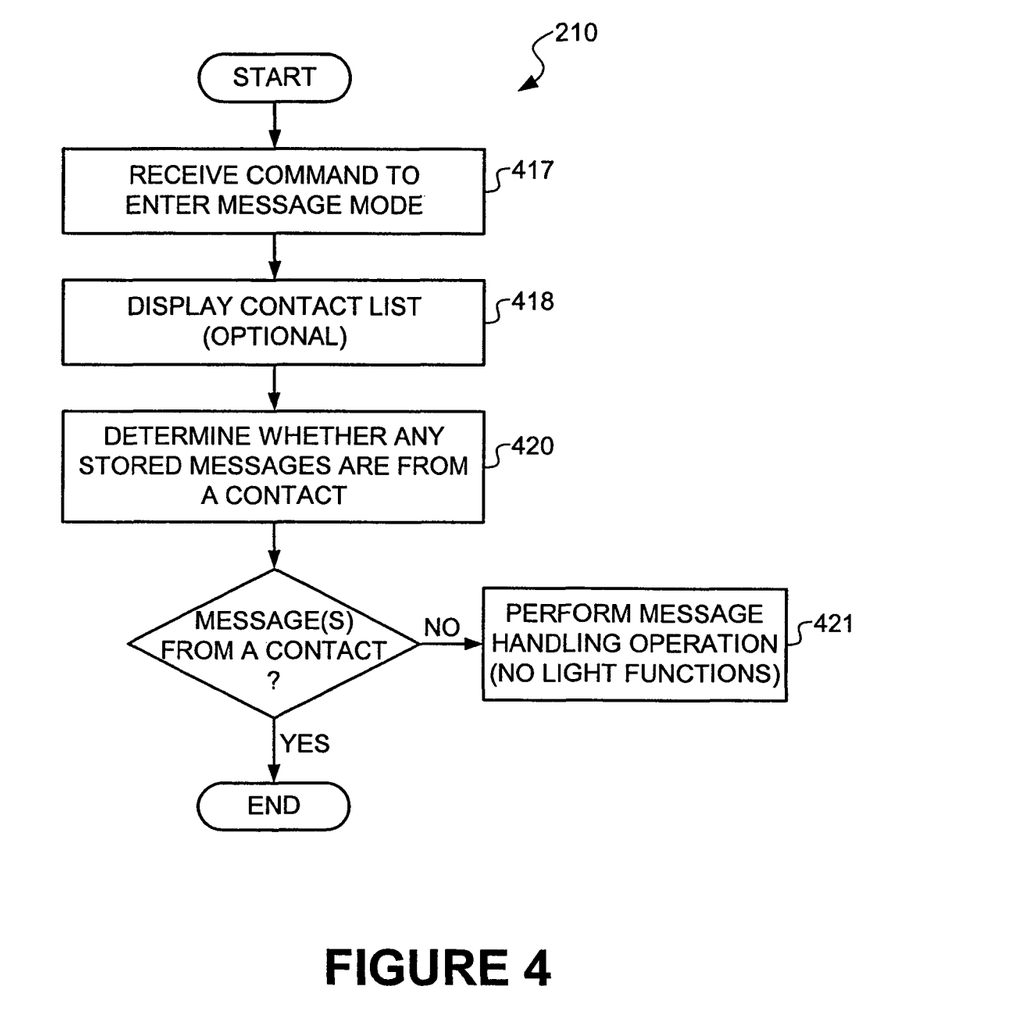
FIG. 4 is a flow diagram illustrating one embodiment of the operational flow of entering a message mode as shown in FIG. 2.

FIG. 4 illustrates step 210 (FIG. 2) in more detail, according to one embodiment of the present invention. As previously described, in step 210, mobile electronic communication device 100 (FIG. 1) enters the message mode.

In a step 417, mobile electronic communication device 100 (FIG. 1) can receive a request or command from the user to enter the message mode. In one embodiment, the user uses mode select keys 127 to cause processor unit 104 (FIG. 1) to configure mobile electronic communication device 100 into the message mode. In other embodiments, mobile electronic communication device 100 automatically enters the message mode after a message is received, thereby skipping step 417. In still other embodiments, mobile electronic communication device 100 can include a voice activation system, which allows the user to use a voice command to configure mobile electronic communication device 100 in the message mode.

In a step 418, the contact list can be displayed. In one embodiment, processor unit 104 (FIG. 1) causes the contact list to be displayed via display 103 (FIG. 1). In this embodiment, each contact in the contact list includes an identifier (e.g., the name) of the contact and connection data. The connection data can be, for example, a telephone number, an e-mail address, etc. In other embodiments, each contact may have more than one set of connection data. Step 418 may be skipped in some embodiments.

In a step 420, mobile electronic communication device 100 determines which, if any, of the stored messages (see step 209) were sent by contacts listed in the contact list. In one embodiment, processor unit 104 accesses message datastore 314 (FIG. 3) to compare the sender identifiers (see FIG. 3) of the stored messages to information stored in the contact list. Depending on the nature of the message, the comparison may be performed in a variety of ways. In one embodiment, if the stored message is a SMS message, the sender's SMS address is compared to the SMS addresses stored in the contact list. Similarly, if the stored message is a voicemail (or and email), the sender's telephone number (or email address) is compared to the telephone numbers (or email addresses) stored in the contact list.

If in step 420 mobile electronic communication device 100 (FIG. 1) determines that none of the stored messages is from a contact, the operational flow proceeds to a step 421. In step 421, in one embodiment, the message received in step 209 (FIG. 2) is handled without performing light functions. In one embodiment, mobile electronic communication device 100 is configured to allow the user to access stored messages. For example, processor unit 104 can be programmed to display prompts or menus via display 103 (FIG. 1), which the user can navigate using keypad 105 (FIG. 1) to view the message received in step 8 (FIG. 1).

However, if in step 420 mobile electronic communication device 100 determines that at least one of the stored messages is from a contact listed in the contact list, step 210 terminates, thereby allowing the operational flow to proceed to step 211 (FIG. 2).

Figure 5:
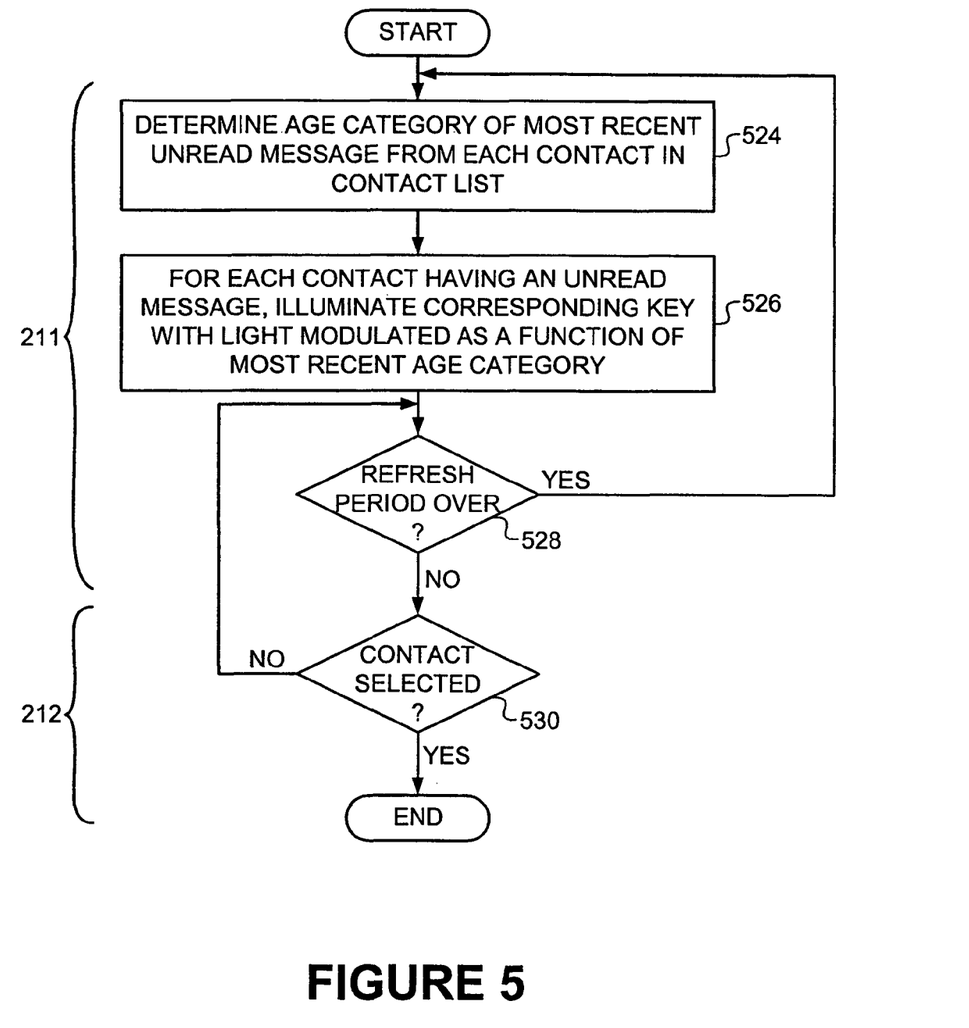
FIG. 5 is a flow diagram illustrating one embodiment of the operational flow of performing light functions as shown in FIG. 2.

FIG. 5 illustrates steps 211 and 212 (FIG. 2) in more detail, according to one embodiment of the present invention. As previously described, in step 211, mobile electronic communication device 100 (FIG. 1) performs light functions to provide an indication of the status of messages received from contacts on the contact list.

In a step 524, the age category of the most recent unread message from each contact in the contact list is determined. In one embodiment, processor unit 104 (FIG. 1) processes entries 315-1 through 315-N of message datastore 314 (FIG. 3) to determine, for each contact, the age category of that contact's most recent unread message. For example, processor unit 104 can compare the time stamp of each unread message to the current time. In one embodiment, mobile electronic communication device 100 (FIG. 1) can receive the current time from a service provider or other source, via transceiver 102 (FIG. 1). In another embodiment, mobile electronic communication device 100 includes an internal clock from which processor unit 104 can retrieve the current time.

In a step 526, keys corresponding to the contacts having unread messages are illuminated with light that is modulated according to the age categories determined in step 524. In one embodiment, processor unit 104 (FIG. 1) is programmed to cause light unit 126 (FIG. 1) to illuminate the keys with the properly modulated light. For example, in one embodiment, if the most recent unread message from the contact corresponding to a particular key were categorized as an "old" message, processor unit 104 would cause light unit 126 to illuminate that particular key with red light (or yellow light if it were an "intermediate" message, or green light if it were a "new" message). On the other hand, if there were no unread messages from a contact corresponding to a particular key, processor unit 104 would cause light unit 126 to leave that particular key unilluminated. In one embodiment, the illumination of step 526 continues until changed. For example, in this embodiment, if a light is set to blink it will keep blinking. In one embodiment, entering step 212 (FIG. 2) can stop the light functions.

In a step 528, mobile electronic communication device 100 (FIG. 1) determines whether a refresh period is expired. In one embodiment, for example, the refresh period can be on the order of "seconds" (e.g., one or two seconds), which would allow for accurate transition from a "new" age category of less that three minutes old to the intermediate age category of between three and fifteen minutes old. If the refresh period is expired, the operational flow returns to step 524. However, if the refresh period is not over, the operational flow proceeds to step 212 (see FIG. 2).

As previously described, in step 212 (FIG. 2), mobile electronic communication device 100 (FIG. 1) receives user input. In one embodiment, this operation can be performed using a step 530. In step 530, mobile electronic communication device 100 determines whether a contact has been selected. In one embodiment, the user selects one of the contacts by activating one of the keys corresponding to a contact in the contact list. For example, processor unit 104 (FIG. 1) can programmed to monitor keypad 105 (FIG. 1) for an actuation of a key. The contact corresponding to the actuated key is the selected contact. Step 212 (FIG. 2) then ends, allowing, the operational flow to proceed to step 213 (FIG. 2).

In an alternative embodiment, step 211 (FIG. 2) may include another decision block in which mobile electronic communication device 100 (FIG. 1) determines whether a timeout period has expired before a contact is selected in step 530. If the timeout has expired, the operational flow can proceed to step 421 (FIG. 4). Alternatively, the entire operational flow of FIG. 2 can be terminated.

Figure 6:
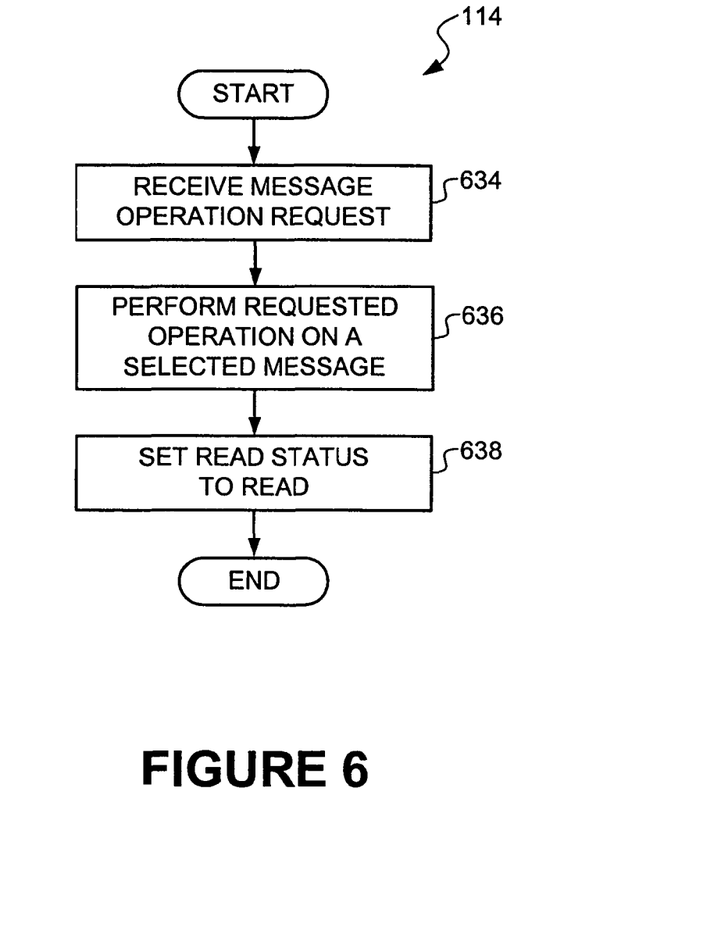
FIG. 6 is a flow diagram illustrating one embodiment of the operational flow of performing a user-selected function as shown in FIG. 2.

FIG. 6 illustrates step 214 (FIG. 2) in more detail, according to one embodiment of the present invention. As previously described, in step 214, mobile electronic communication device 100 (FIG. 1) accesses a message displayed in step 213 (FIG. 2).

In a step 634, a request for a message handling operation is received. In one embodiment, the user selects a message from in the message log displayed in step 213 (FIG. 2) via keypad 105 (FIG. 1). The user can then select an operation to perform on the selected message such as, for example, read, delete, reply, save or other message handling operations. For example, processor unit 104 (FIG. 1) can be programmed to provide various message handling operations in a menu displayed via display 103 (FIG. 1). In embodiments in which SMS messages are displayed in the message log (see step 213), no further action is needed to read an SMS message; however, the user may request other operations (e.g., deleting, saving, replying) in step 634 to be performed on a selected SMS message.

In a step 636, the requested operation is performed on the selected message. In one embodiment, processor unit 104 (FIG. 1) is programmed to control various elements of mobile electronic communication device 100 (FIG. 1). For example, if the user selects a read operation command to be performed on an email message, processor unit 104 can access the message data from message datastore 314 (FIG. 3) and provide the message data to display 103 (FIG. 1) to be displayed to the user. As another example, if the user selects a delete operation to be performed on a selected SMS message, processor unit 104 can access message datastore 314 and delete the entry.

In a step 638, the read status of the selected message is set to read. In one embodiment, processor unit 104 updates message datastore 314 so that the read status field corresponding to the selected message indicates that the message has been read. If the user deleted the selected message in step 636, then step 638 is skipped.

Figure 7:
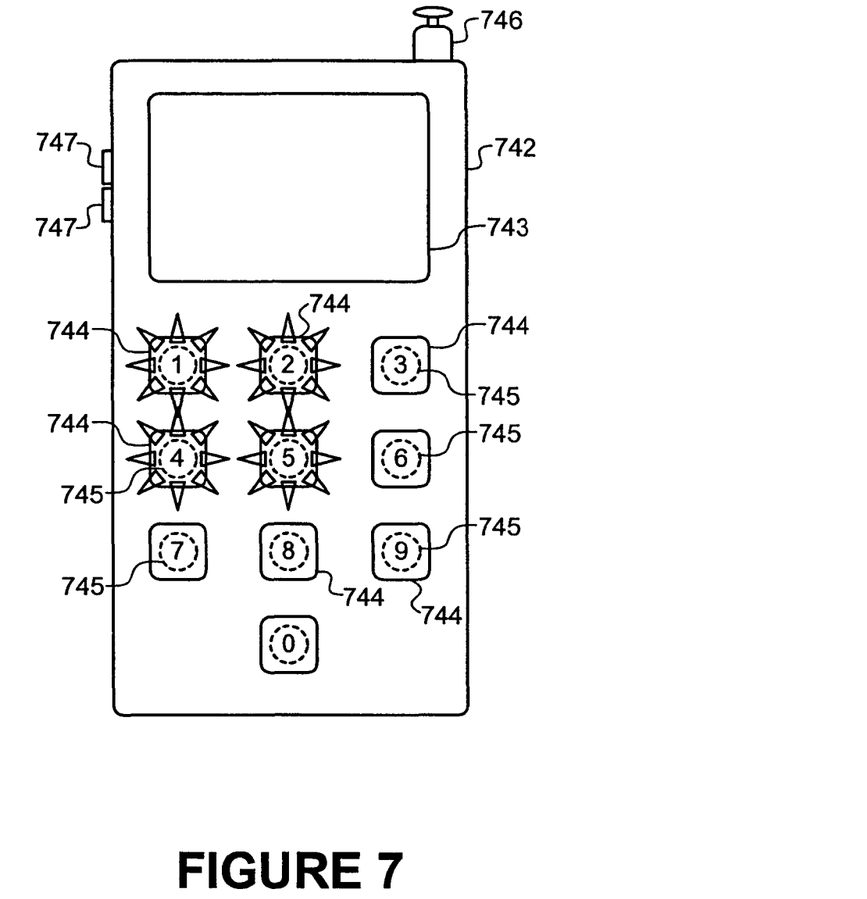
FIG. 7 is a diagram illustrating the face of a mobile electronic communication device having a keypad, according to one embodiment of the present invention.

FIG. 7 shows an exemplary front view (not to scale) of a mobile electronic communication device according to the present invention. In this embodiment, the mobile electronic device is a cellular telephone 742 that includes a LCD 743, keys 744, LEDs 745 (shown in phantom), an antenna 746, and buttons 747. LCD 743, keys 744, LEDs 745 and buttons 747 are used to implement display 103, keypad 105, light unit 126, and mode select keys 127 as shown in FIG. 1. In particular, each key of keys 744 has at least one LED of LEDs 745 mounted in cellular telephone 742 below that key. In one embodiment, keys 744 are translucent or partially translucent so that light emitted by LEDs 745 can be transmitted through keys 744. In some embodiments, the light can be visible from the perimeter of the keys of keys 744, which can be advantageous when keys 744 are not translucent.

In the exemplary embodiment shown in FIG. 7, the "1" key of keys 744 is illuminated with green light to indicate that a "new" message has been received from the contact associated with the "1" key. Continuing the example, the "4" and "5" keys of keys 744 are illuminated with yellow light to indicate that an "intermediate" message has been received from contacts associated with the "4" and "5" keys. The "2" key of keys 744 is illuminated with red light to indicate that an "old" message has been received from the contact associated with the "2" key. As shown in FIG. 7, more than one key of keys 744 may be simultaneously illuminated to indicate the source and status of messages received from multiple contacts.

In one embodiment, each key of keys 744 is illuminated by a multicolor LED of LEDs 745. In this embodiment, the multicolor LED is capable of outputting more than one color of light. For example, the multicolor LED can output red, yellow or green light, in response to signals received from processor unit 104 (FIG. 1). In an alternative embodiment, each key of keys 744 is illuminated by a set of two or more LEDs of LEDs 745. Each LED of the set is selected to output a different color. For example, each set may include three LEDs, a first LED capable of outputting red light, a second LED capable of outputting yellow light, and a third LED capable of outputting green light.

Although the use of three colors is described above in other embodiments, LEDs 745 can output a different number of colors, depending on the number of age categories. For example, the light from red, blue and green LEDs may be combined to produce a large range of different colors by appropriately controlling the intensity of the light outputted by each LED.

Figure 8:
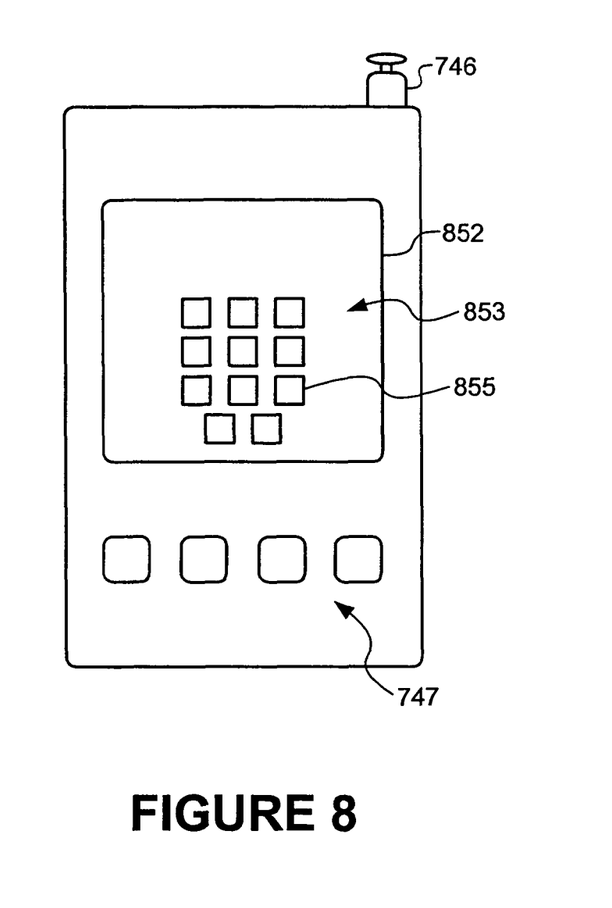
FIG. 8 is a diagram illustrating the face of a mobile electronic communication device having a virtual keypad, according to one embodiment of the present invention.

FIG. 8 also shows an exemplary front view (not to scale) of a mobile electronic communication device according to the present invention. In this embodiment, the mobile electronic communication device includes a touch-screen LCD 852 that can be used to display a virtual keypad 853. Such touch-screen devices are commercially available. In this embodiment, light functions (see the above description of step 211 of FIG. 2) can be performed by changing the color or shade of one or more virtual keys 855 of virtual keypad 853 being displayed by touch-screen LCD 852. In addition, the light functions may "animate" a virtual key 855 to indicate one or more parameters of a received message (e.g. to morph into a telephone illustration, blink, rotate, appear to vibrate, etc.). A user can then select a contact by pressing a virtual key 855 displayed by touch-screen LCD 852.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A mobile electronic communication device comprising:
    a transceiver;
    a light unit having a plurality of light sources, wherein each of the light sources is associated with an identity of a particular contact from a contact list;
    a processor unit coupled to the transceiver and light unit; and
    non-transitory storage media containing instructions that, in response to execution on the processor unit, cause the light unit to output light from a selected one of the light sources to indicate, for a received message, the identity of the contact that sent the received message, wherein the instructions further cause the light unit to output light with modulation that depends on an age category of a message received by the mobile electronic communication device out of a plurality of predetermined age categories, wherein:
        each age category of the plurality of age categories is represented by a predetermined color of light that can be output by the light unit; and
        each age category of the plurality of age categories is represented by a predetermined number of light flashes within a cycle.

2. The mobile electronic communication device of claim 1, wherein:
    the mobile electronic communication device is configured to receive messages of two or more types; and
    in response to execution on the processor unit, the instructions further cause the light unit to output the light with modulation that depends on the received message's type.

3. The mobile electronic communication device of claim 2, wherein the message is a SMS message.

4. The mobile electronic communication device of claim 1, wherein the selected one of the light sources being lit is associated with the identity of the particular contact prior to receipt of the message.

5. The mobile electronic communication device of claim 4, wherein, in response to execution on the processor unit, the instructions further cause the light unit to simultaneously illuminate an other light source to indicate that an other message has been received from an other contact, wherein the other contact is associated with the other light source prior to receipt of the other message.

6. The mobile electronic communication device of claim 1, wherein, in response to execution on the processor unit the instructions further cause the light unit to output light with modulation that depends on an age of a message received by the mobile electronic communication device.

7. The mobile electronic communication device of claim 6, wherein the modulated light has a color that depends on the relative age of a received message.

8. The mobile electronic communication device in claim 6, wherein the message is a most recent message received from a contact.

9. The mobile electronic communication device of claim 8, wherein the message is an unread message received from the contact.

10. The mobile electronic communication device of claim 1, wherein:
    the light unit comprises a touch-screen display that renders a virtual light unit having a plurality of virtual light sources, with a selected one of the virtual light sources manifesting an appearance of being illuminated.

11. The mobile electronic communication device of claim 1, wherein the touch-screen display comprises an LED circuit having a plurality of LEDs configured to selectively output light having a color selected from a set of a plurality of preselected colors.

12. A mobile electronic communication device comprising:
    a transceiver; and
    means coupled to the transceiver to output light, the output light associated with an identity of a particular contact, to indicate, for a received message, the identity of the contact that sent the received message and to blink the output light with a number of light flashes in a cycle and color of light that depends on an age category of a message received by the mobile electronic communication device out of a plurality of predetermined age categories.

13. The mobile electronic communication device of claim 12, wherein the mobile electronic communication device is configured to receive messages of two or more types, wherein said means is configured to output light with modulation that depends on the received message's type.

14. The mobile electronic communication device of claim 12, wherein the output light is associated with the particular contact prior to receipt of the message.

15. The mobile electronic communication device of claim 12, wherein the mobile electronic communication device is configured to receive messages of two or more types, wherein said means is configured to output light with modulation that depends on the received message's type and an age of the message received.

* * * * *